Aug. 5, 1924.

H. P. KRAFT ET AL 1,503,759

PRESSURE INDICATOR

Original Filed July 14, 1909

INVENTORS:
Henry P. Kraft and
Maximilian Charles Schweinert
By Attorneys,

WITNESSES:

Patented Aug. 5, 1924.

1,503,759

UNITED STATES PATENT OFFICE.

HENRY P. KRAFT, OF RIDGEWOOD, NEW JERSEY, AND MAXIMILIAN CHARLES SCHWEINERT, OF NEW YORK, N. Y.

PRESSURE INDICATOR.

Original application filed July 14, 1909, Serial No. 507,565. Patent No. 1,176,707, dated March 27, 1916. Divided and this application filed February 23, 1916, Serial No. 79,880. Renewed January 4, 1923.

*To all whom it may concern:*

Be it known that we, HENRY P. KRAFT, residing in Ridgewood, in the county of Bergen and State of New Jersey, and MAXIMILIAN CHARLES SCHWEINERT, residing in New York, in the county of New York and State of New York, both citizens of the United States of America, have invented certain new and useful Improvements in Pressure Indicators, of which the following is a specification.

This application is a division of our application filed July 14, 1909, Serial No. 507,565.

This invention relates to pressure indicators, and is especially adapted for indicating the pressures in pneumatic tires or other similar devices.

According to our invention we provide a pressure indicator which in its preferred form is adapted to be applied directly to a pneumatic tire valve of any standard construction, or to an intermediate pump connection which itself is applied to a valve, so that the pressures within the tire are indicated during the act of inflation. In the most complete form of the invention, means are provided not only for indicating the pressures within the tire, but also for relieving the pressure when the latter rises to a predetermined height, so that it is impossible to pump into the tire any greater pressure than that indicated.

Various other features of improvement will be hereinafter pointed out.

Referring to the drawings, which illustrate several forms of the invention,—

Figure 1:
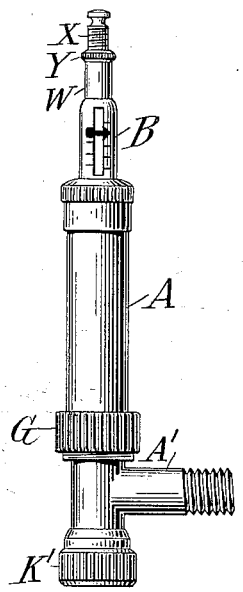
Figure 1 is an elevation of the complete indicator and pressure relief mechanism adapted for attachment to a pump and a tire valve.
Figure 3:
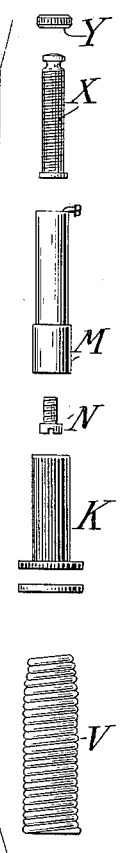
Fig. 3 is a view showing various parts of Fig. 1 in elevation.

Referring to the drawings, let A indicate a suitable casing having swiveled to its upper end an extension B, such extension having a flange C adapted to fit over a flange D formed on the casing A. The flange C is preferably provided with a knurled portion E by means of which the extension B may be easily rotated for a purpose hereinafter described.

At its lower end the casing A is formed with a flange F designed to be engaged by a coupling G, so that the casing may be secured to a pump connection H or other member.

Within the lower part of the casing A is located an expansible tube I preferably formed of rubber, the lower end of which is provided with a flange J by which it may be fastened at the lower part of the casing, preferably by being squeezed against the pump connection H or other device by the coupling G, so that a tight connection is made at this point. The tube I, which is in the form of a thimble, that is to say, is closed or partly closed at one end, forms on its interior an expansion chamber K within which the air, which is to be measured as to its pressure, is admitted in any suitable way. The upper end of the thimble I in these figures is partly closed, it being perforated only sufficiently to permit the passage of a screw L, by which the thimble is connected to an indicating member M, the screw having a passage N in the construction shown by which air is admitted to a valve chamber O formed in the indicating member M. Mounted in the valve chamber O is a valve seat P held in place by screw plug Q, and coacting with such seat is a valve proper R connected with a stem S. These parts are preferably of the usual Schrader valve type, although there may be many suitable constructions.

When there is air under pressure in the chamber K this is communicated through the bore or opening N in the screw L, and thence to the valve chamber O, forcing the valve proper R to its seat. Under these conditions the pressure within the chamber K will extend the tube or thimble I and raise the indicating member M to a greater or less extent depending upon the degree of pressure. Any suitable means for indicating the movements of the member M may be adopted. I prefer, however, to provide the extension B with a slot or opening T through which may be observed the top edge U of the member M. The extension B may be formed of suitable graduations or other indicating marks as illustrated in Fig. 1.

While the resistance of the thimble or tube I may in some cases be utilized for opposing the pressure, we prefer to augment this by a spring V, the lower end of which is expanded as shown to engage the lower end of the casing A while the upper end is contracted to engage a reduced portion of the indicating member M. By this means the spring constitutes a load which increases with the pressure. The spring also performs an important function in connection with the tube I. If the spring were omitted, there would be liability of the tube expanding laterally under the pressure so that it would rub against the inner sides of the casing, and be liable to other deformations. The tube prevents this expansion and constitutes a protecting expansible and contractable casing or shell for the tube.

Figure 2:
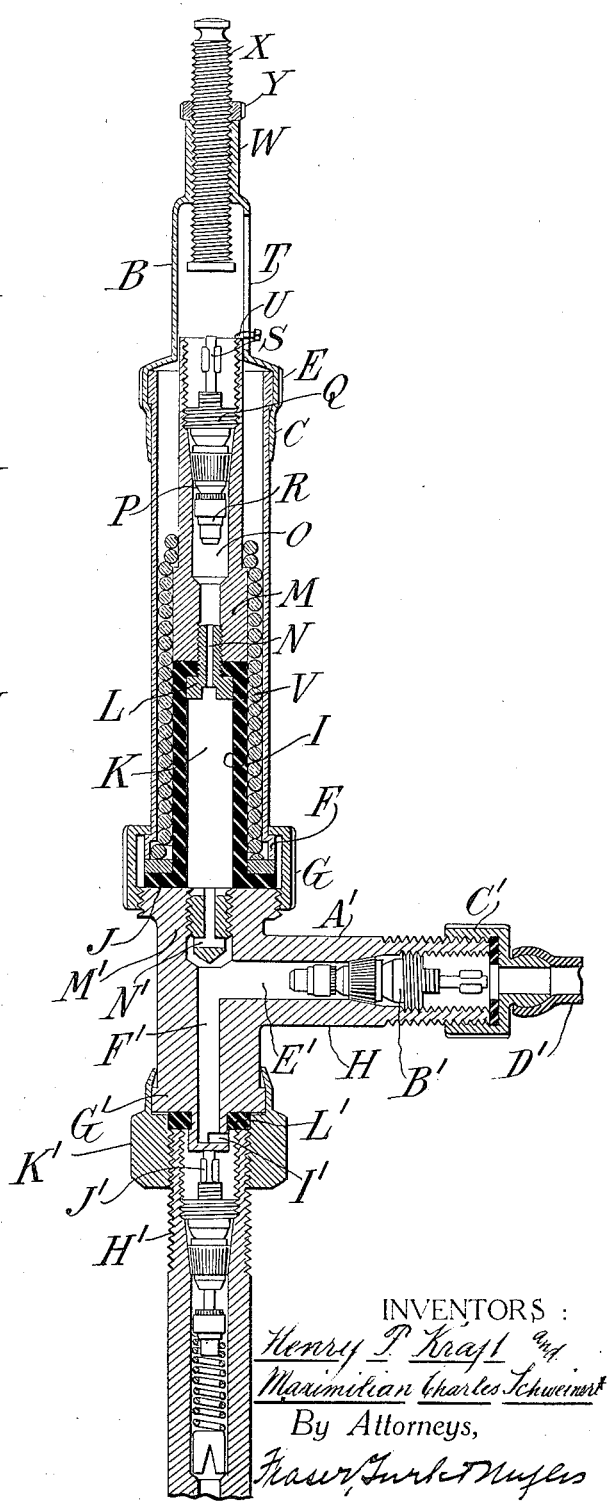
Fig. 2 is a diametrical section of the device of Fig. 1 on a larger scale.

An important feature in this connection is the proportioning of the spring V. If this spring were only as long as the tube, the convolutions of the spring would separate to such an extent during the maximum expansion of the tube as to minimize the protecting effect of the spring. We hence make the effective length of the spring considerably longer than the tube, as shown in Fig. 2 wherein the spring is effective from its point of connection with the reduced part of the indicating member M to its point of connection with the flange F of the casing A. By this means the spring places a sufficient load upon the movements of the indicating member M to secure a proper indication of the pressures, while at the same time the convolutions of the spring separate to so small an amount in use that the tube or thimble is adequately protected, and does not to any material extent force its way between such convolutions.

According to our invention we prefer to provide means whereby when a predetermined or set pressure is reached no further substantial increase of pressure within the tire is permitted. The mechanism provided for that purpose in the present construction is shown best in Fig. 2. In this figure the extension B is provided with a reduced portion W which is screw-threaded on its interior, and a gauge bar X is screwed in said extension, a lock nut Y being preferably provided to hold the plunger in its adjusted positions. To set the device the lock nut Y is loosened, and the plunger screwed in until its lower end is opposite whatever pressure is desired on the indicating scale of the extension B. The lock nut is then turned to clamp the parts. As the indicating member M rises under the pressure, the stem S of the valve R engages the lower end of the gauge-bar X, and a slight further movement pushes the valve R from its seat, permitting the escape of air from the valve chamber O and expansion chamber K.

Under these conditions when our device is combined with a pump connection, the incoming air from the pump instead of flowing to the tire passes through the chambers K and O into the extension B and thence through the opening T to the outer air.

In Fig. 2 we have illustrated the invention as combined with the pump connection H. This pump connection consists of a plug having a lateral arm A' within which is mounted a suitable valve mechanism B', while there is screwed to the end of the connection A' a nipple member C' adapted to be connected with the rubber pump tube D'. The extension A' has a bore E' leading to the vertical bore F' of the connection, which latter is extended downwardly into a projection G' designed to enter the top of a tire valve shell H'. The projection G' is preferably imperforate on its lower side but a lateral opening I' is provided through which the air passes into the tire valve. The function of the imperforate lower wall I' is to press down the stem J' of the tire valve, so that during the pumping operation the tire valve is held in its open position. The purpose of this construction is to provide a free connection for the air between the tire and the chamber K through the bore F'. In use with a pump the valve B' of the lateral extension A' serves as a check valve to prevent the back flow of air into the pump. The lower end of the extension H is preferably provided with a coupling K' swiveled thereto, and adapted to screw on the end of the tire valve shell while a packing L' is fitted around the projection G' to make a tight joint with the valve shell.

In order to avoid jumping or pulsating of the part M, we preferably introduce into the pump connection or other suitable point a plug M' which has a T-shaped bore N' leading at right angles into the central bore F' of the part H. By this construction the direct passage of air into the expansion chamber K is avoided, it being necessary for the air to work itself around into the angular passage N'; when the air is being pumped into the device therefore its pulsating effect is broken up before it reaches the expansion chamber K.

In the construction just described it is preferable to swivel the extension B³ to the casing A in order that the opening T may be turned opposite the user no matter what the position of the indicator may be.

In the form of the invention disclosed it is preferable that the extensible tube be constructed as a thimble, that is to say, with one end at least partially closed as it much facilitates connection with the plunger, and permits a leak-tight joint to be easily formed. It is also important that the tube be formed with a flange at its lower end as this much facilitates its connection with the casing or other part to which it is attached, and provides an easily made leak-tight joint at this point.

While we have shown and described a preferred embodiment of the invention, it is to be understood that we do not wish to be limited to the specific construction shown, since various changes may be made therein without departing from the invention.

What we claim is:—

1. In an indicating device for pneumatic tires or the like, comprising a casing, an expansible tube in said casing, said expansible tube formed as a nipple, an indicating device the lower end of which is connected to said tube by a perforated screw, a valve in said indicating member, and an adjustable gauge-bar in the casing adapted to coact with said valve.

2. A pressure gauge having a casing, a pressure-responsive member and comprising an elastic sleeve, a valve in said pressure-responsive member, and an adjustable means in the casing for opening said valve when a definite pressure is reached.

3. A combined pump coupling, pressure gauge, and relief valve having means for connection to a pneumatic tire valve or the like, means for introducing air to the tire, a pressure-responsive member movable to various positions in accordance with the pressure, and a check valve operable at a predetermined point in the movement of said pressure responsive member, all of said parts being operable during inflation of the tire.

4. A combined pump coupling, pressure gauge, and relief valve having means for connection to a tire or the like, means for introducing air to the tire, a pressure-responsive member operable by the air and adapted to move to various positions, and an adjustable relief means operable after a predetermined movement of said pressure-responsive member, all of said parts being operable during inflation of the tire.

5. A combined pump coupling, pressure gauge, and relief valve having means for connection to a pneumatic tire or the like, means for introducing air to the tire, and a pressure-responsive member having a valve at its upper end, and an adjustable abutment adapted to open said valve at a predetermined movement of said pressure-responsive member, all of said parts being operable during inflation of the tire.

In witness whereof, we have hereunto signed our names in the presence of two subscribing witnesses.

HENRY P. KRAFT.
MAXIMILIAN CHARLES SCHWEINERT.

Witnesses:
G. J. SANSOM,
WM. T. HUNTER.